United States Patent
Gladden

(10) Patent No.: US 6,357,234 B1
(45) Date of Patent: Mar. 19, 2002

(54) TURBOCHARGER SYSTEM WITH TURBINES HAVING INDEPENDENTLY CONTROLLED VARIABLE NOZZLES

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/666,696

(22) Filed: Sep. 21, 2000

(51) Int. Cl.$^7$ ............................... F02B 33/44
(52) U.S. Cl. ................ 60/612; 60/611; 60/605.1; 60/602; 415/11; 416/198 A; 417/280
(58) Field of Search ................ 60/612, 605.1, 60/605.2, 611, 602; 415/11; 416/198 A; 417/280

(56) References Cited

U.S. PATENT DOCUMENTS

| | | | |
|---|---|---|---|
| 3,941,506 A | * | 3/1976 | Robb et al. ............ 416/198 A |
| 4,807,150 A | * | 2/1989 | Hobbs ........................ 415/11 |
| 4,809,497 A | * | 3/1989 | Schuh ........................ 417/280 |
| 5,105,624 A | * | 4/1992 | Kawamura .................. 60/612 |
| 5,157,924 A | * | 10/1992 | Sudmanns .................. 60/612 |
| 5,845,495 A | | 8/1998 | Schray et al. |
| 6,145,313 A | * | 11/2000 | Arnold ........................ 60/612 |
| 6,202,414 B1 | * | 3/2001 | Schmidt et al. ............... 60/612 |

FOREIGN PATENT DOCUMENTS

DE          39 32 721 C1  * 10/1990  ............... 60/612

* cited by examiner

Primary Examiner—Thomas Denion
Assistant Examiner—Thai Ba Trieu
(74) Attorney, Agent, or Firm—Todd T. Taylor

(57) ABSTRACT

A turbocharger system for an internal combustion engine is provided with a plurality of turbochargers. Each turbocharger includes a rotatable shaft; a turbine having turbine wheel carried by the shaft, an inlet and a variable nozzle at the inlet; and a multi-stage compressor. The multi-stage compressor includes a first compressor wheel carried by the shaft, an axially extending first inlet associated with the first compressor wheel, a radially extending first outlet associated with the first compressor wheel, a second compressor wheel carried by the shaft, an axially extending second inlet associated with the second compressor wheel, a radially extending second outlet associated with the second compressor wheel, and a interstage duct fluidly interconnecting in series the first outlet associated with the first compressor wheel with the second inlet associated with second compressor wheel. At least one sensor is provided, with the sensor being configured to sense an operating parameter associated with the turbocharger system and provide an output signal. A controller is coupled with each sensor and with each variable nozzle. The controller independently controls operation of each variable nozzle dependent upon at least one output signal.

24 Claims, 2 Drawing Sheets

TURBOCHARGER SYSTEM WITH TURBINES HAVING INDEPENDENTLY CONTROLLED VARIABLE NOZZLES

TECHNICAL FIELD

The present invention relates to a turbocharger system in an internal combustion engine, and, more particularly, to a turbocharger system including a plurality of turbines with individual variable nozzles.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chamber. The fluid which is compressed by the compressor may be in the form of combustion air or a fuel and air mixture.

It is known to detect a difference in output between multiple turbochargers in a turbocharger system to determine whether a failure has occurred. For example, U.S. Pat. No. 5,845,495 (Schray et al.) discloses a turbocharger system with each turbocharger having a turbine and single compressor wheel. If a speed deviation above a threshold level occurs between the turbochargers, corrective actions may be taken to prevent damage to one or more of the turbochargers. Such a system is effective to prevent damage to the individual turbochargers, but fails to provide optimum output performance from the turbocharger system.

The present invention is directed to overcoming one or more of the problems as set forth above.

DISCLOSURE OF THE INVENTION

In one aspect of the invention, a turbocharger system for an internal combustion engine is provided with a plurality of turbochargers. Each turbocharger includes a rotatable shaft; a turbine having a turbine wheel carried by the shaft, an inlet and a variable nozzle at the inlet; and a multi-stage compressor. The multi-stage compressor includes a first compressor wheel carried by the shaft, an axially extending first inlet associated with the first compressor wheel, a radially extending first outlet associated with the first compressor wheel, a second compressor wheel carried by the shaft, an axially extending second inlet associated with the second compressor wheel, a radially extending second outlet associated with the second compressor wheel, and an interstage duct fluidly interconnecting in series the first outlet associated with the first compressor wheel with the second inlet associated with second compressor wheel. At least one sensor is provided, with each sensor being configured to sense an operating parameter associated with the turbocharger system and provide an output signal. A controller is coupled with each sensor and with each variable nozzle. The controller independently controls operation of each variable nozzle dependent upon at least one output signal.

In another aspect of the invention, a method of operating a turbocharger system in an internal combustion engine is provided with the steps of: providing a plurality of turbochargers, each turbocharger including a rotatable shaft; a turbine having a wheel carried by the shaft, an inlet and a variable nozzle at the inlet; and a multi-stage compressor including a first compressor wheel carried by the shaft, an axially extending first inlet associated with the first compressor wheel, a radially extending first outlet associated with the first compressor wheel, a second compressor wheel carried by the shaft, an axially extending second inlet associated with the second compressor wheel, a radially extending second outlet associated with the second compressor wheel, and an interstage duct fluidly interconnecting in series the first outlet of the first compressor wheel with the second inlet of the second compressor wheel; sensing at least one operating parameter associated with the turbocharger system using a sensor; and independently controlling operation of each variable nozzle using a controller, dependent upon the sensed operating parameter.

BEST MODE FOR CARRYING OUT THE INVENTION

Figure 1:
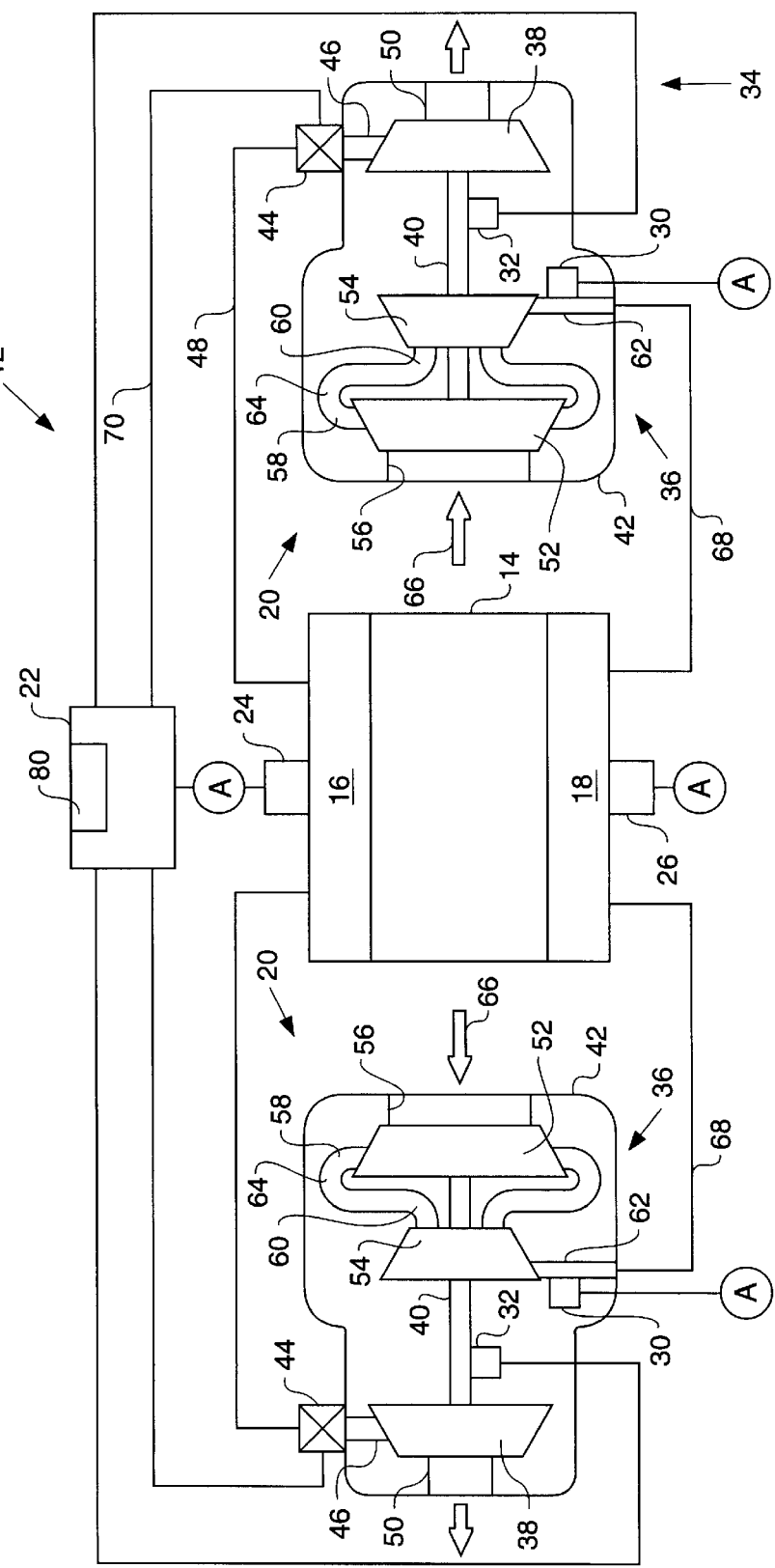
FIG. 1 is a schematic illustration of an embodiment of an internal combustion engine of the present invention.

Referring now to the drawings, and more particularly to FIG. 1, there is shown an internal combustion engine 10 including an embodiment of a turbocharger system 12 of the present invention. Internal combustion engine 10 includes a block 14 and a plurality of combustion cylinders (not shown). An exhaust manifold 16 and an intake manifold 18 are associated with the combustion cylinders. Exhaust manifold 16 transports exhaust gas away from the combustion cylinders; and intake manifold 18 transports combustion air or a fuel and air mixture to the combustion cylinders.

Turbocharger system 12 includes a plurality of turbochargers 20, a controller 22, and one or more sensors 24, 26, 30 and 32.

Each turbocharger 20 includes a variable nozzle turbine (VNT) 34; and a multi-stage (e.g., two-stage) compressor 36. VNT 34 includes a turbine wheel 38 carried by a shaft 40, which in turn is carried by housing 42. A variable nozzle 44 is disposed at an inlet 46 of VNT 34. Inlet 46 is fluidly coupled with exhaust manifold 16 via fluid line 48. Exhaust gas flowing from exhaust manifold 16 flows through variable nozzle 44 and rotatably drives turbine wheel 38. The exhaust gas is transported from VNT 34 via outlet 50.

Each multi-stage compressor 36 includes a first compressor wheel 52 and a second compressor wheel 54, each being carried by common shaft 40. A first inlet 56 and first outlet 58 are associated with first compressor wheel 52; and a second inlet 60 and second outlet 62 are each associated with second compressor wheel 54. An interstage duct 64 fluidly interconnects first outlet 58 with second inlet 60. Ambient air is drawn into first inlet 56, as indicated by arrow 66, and compressed by each of first compressor wheel 52 and second compressor wheel 54. The compressed air then flows through second outlet 62 to intake manifold 18 via fluid line 68.

Controller 22 is coupled with each variable nozzle 44 via line 70, and independently controls operation of each variable nozzle 44 dependent upon an output signal received from one or more sensors 24, 26, 30 and 32. Controlling operation of each variable nozzle 44 basically adjusts the cross-sectional area of each corresponding inlet 46, thereby controlling the velocity of the exhaust gas which impinges upon and drives turbine wheel 38. By controlling operation of variable nozzle 44 associated with each turbocharger 20, the rotational speed of each corresponding first compressor wheel 52 and second compressor wheel 54 is thereby controlled. This in turn means that the pressure of the compressed combustion air supplied by each turbocharger 20 to intake manifold 18 is likewise controlled.

Sensors 24, 26, 30 and 32 each provide a plurality of output signals to controller 22 which may be associated with a rotational speed of shaft 40 within turbocharger 20. Sensor 24 senses pressure within exhaust manifold 16; sensor 26 senses pressure within intake manifold 18; each sensor 30 senses pressure within a diffuser area associated with a second outlet 62 of a turbocharger 20; and each sensor 32 senses a rotational speed of a corresponding shaft 40. Sensors 26, 30 and 32 are schematically shown connected with controller 22 at reference letter AA@ for ease of illustration.

Utilizing turbocharger system 12 as described above, the rotational speed of shaft 40 and/or output pressure from each turbocharger 20 may be substantially matched with each other.

Figure 2:
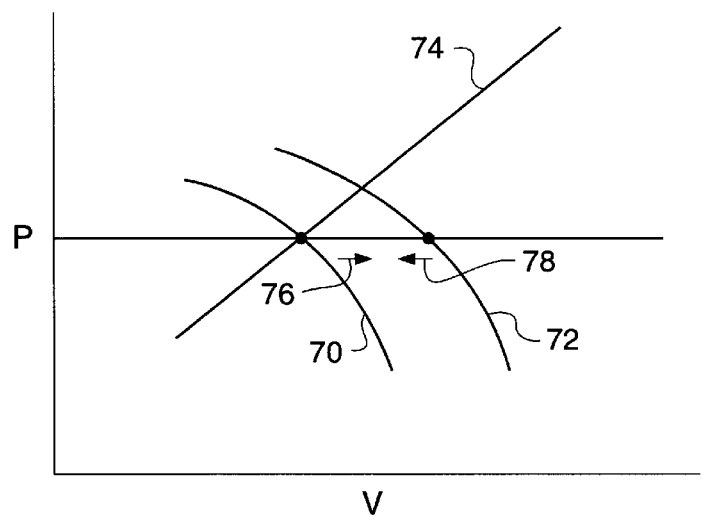
FIG. 2 is a graphical illustration of a compressor operating map for a turbocharger in an embodiment of a turbocharger system of the present invention.

Referring now to FIG. 2, there is shown a graphical illustration of operating curves for compressor wheels at different rotational speeds. The volumetric flow rate (V) is indicated on the ordinate axis; and the pressure ratio (P) is indicated on the abscissa axis. Curves 70 and 72 indicate the relationship between pressure and volumetric flow rate for a compressor wheel rotating at different rotational speeds. Curve 72 corresponds to a rotational speed which is higher than curve 70. Line 74 represents a surge line for a compressor. An operating point along curve 70 or 72 should not cross over to the left of surge line 74 or a surge condition will result, which is undesirable. By controlling one or both variable nozzles 44, curve 70 and/or curve 72 may be shifted toward each other and away from surge line 74, as indicated by arrows 76 and 78. Thus, it is possible to match the pressure ratios provided by each compressor, as well as ensure that each compressor does not enter into a surge condition.

Figure 3:
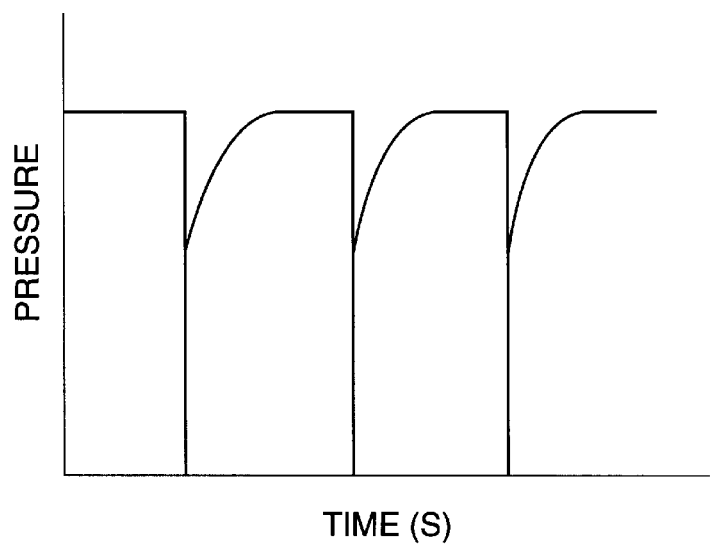
FIG. 3 is a graphical illustration of pressure within a turbocharger system of the present invention during a surge condition.

FIG. 3 illustrates pressure fluctuations which may occur over time as a result of a surge condition of one or more turbochargers 20. Under a surge condition, the volumetric flow rate is too low and the pressure ratio is too high. Thus, the flow separates from the suction side of the blades of the compressor wheels and the discharge process is interrupted. The air flow through the compressor is reversed until a stable pressure ratio with positive volumetric flow rate is reached, the pressure builds up again and the cycle repeats. The resultant sensed pressure is generally as shown in FIG. 3. This pressure can be sensed at second outlet 62 using sensor 30; or intake manifold 18 using sensor 26.

INDUSTRIAL APPLICABILITY

During use, exhaust gas flows from exhaust manifold 16 to VNT 34 via fluid line 48. Each variable nozzle 44 is independently controlled using controller 22, dependent upon one or more output signals from sensors 24, 26, 30 and 32. The rotational speed of each shaft 40 may be measured using a sensor 32 to control the speed of each turbocharger 20. Shaft 40 carries and thereby rotates first compressor wheel 52 and second compressor wheel 54. Ambient air is drawn into first inlet 56 and compressed using first compressor wheel 52. The compressed combustion air flows through interstage duct 64 to second compressor wheel 54. Second compressor wheel 54 further compresses the combustion air and discharges the compressed combustion air through second outlet 62 to intake manifold 18.

The present invention provides a turbocharger system having a plurality of turbochargers. Each turbocharger has a VNT 34 and a multi-stage compressor 36. One or more VNT's 34 are controlled by controlling a corresponding variable nozzle 44 such that the rotational speed of a shaft associated with each turbocharger 20 is substantially equal. This in turn means that the pressure ratio provided by each multi-stage compressor 36 is substantially the same, assuming that each compressor is configured the same. Moreover, each multi-stage compressor 36 may be controlled to prevent a surge condition.

In the embodiment shown, turbochargers 20 are configured with substantially identical multi-stage compressors 36. However, it is also possible to configure turbochargers 20 with different multi-stage compressors. Even if the multi-stage compressors are configured differently, the pressure ratio from each multi-stage compressor may be matched by sensing pressure at selected locations, as indicated above, and controlling variable nozzles associated with each VNT.

Controller 22 optionally includes a memory 80, such as a read only memory (ROM), used to store data corresponding to a surge condition of one or more of turbochargers 20. If turbochargers 20 are configured substantially identical, data corresponding to a single compressor map may be stored within memory 80. The data may be stored, e.g., in the form of a look-up table which is used to establish whether a compressor is approaching or in a surge condition.

Other aspects, objects and advantages of this invention can be obtained from a study of the drawings, the disclosure and the appended claims.

What is claimed is:

1. A turbocharger system for an internal combustion engine, comprising:
    a plurality of turbochargers, each said turbocharger including:
        a rotatable shaft,
        a turbine having a turbine wheel carried by said shaft, an inlet and a variable nozzle at said inlet; and
        a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, a radially extending second outlet associated with said second compressor wheel, and an interstate duct fluidly interconnecting in series said first outlet associated with said first compressor wheel with said second inlet associated with said second compressor wheel;
    at least one sensor, each said sensor configured to sense an operating parameter associated with said turbocharger system and provide an output signal, said at least one sensor including a plurality of speed sensors, each said speed sensor configured to sense a rotational speed of a corresponding said shaft; and
    a controller coupled with each said sensor and each said variable nozzle, said controller independently controlling operation of each said variable nozzle dependent upon at least one said output signal, said controller controlling operation of each said variable nozzle such that each said shaft has a rotational speed which is substantially equal.

2. The turbocharger system of claim 1, said controller independently controlling operation of each said variable nozzle dependent upon a plurality of said output signals.

3. The turbocharger system of claim 1, each said sensor configured to sense a corresponding one of:
   a rotational speed of a corresponding said shaft;
   a pressure associated with at least one said turbocharger; and
   a pressure ratio across a corresponding said multi-stage compressor.

4. The turbocharger system of claim 3, wherein said pressure corresponds to one of said first outlet and said second outlet.

5. The turbocharger system of claim 1, including a memory device for storing data relating to an operating map of each said multi-stage compressor.

6. The turbocharger system of claim 5, wherein said memory device includes at least one look-up table.

7. The turbocharger system of claim 6, wherein said memory device includes a plurality of look-up tables, each said look-up table associated with at least one multi-stage compressor.

8. The turbocharger system of claim 6, wherein each said look-up table includes data corresponding to a surge condition of at least one said multi-stage compressor.

9. The turbocharger system of claim 5, wherein said controller includes said memory device.

10. A turbocharger system for an internal combustion engine, comprising:
    a plurality of turbochargers, each said turbocharger including:
    a rotatable shaft;
    a turbine having a turbine wheel carried by said shaft, an inlet and a variable nozzle at said inlet; and
    a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, a radially extending second outlet associated with said second compressor wheel, and an interstage duct fluidly interconnecting in series said first outlet associated with said first compressor wheel with said second inlet associated with said second compressor wheel;
    at least one sensor, each said sensor configured to sense an operating parameter associated with said turbocharger system and provide an output signal, each said sensor configured to sense a corresponding one of:
    a rotational speed of a corresponding said shaft;
    a pressure associated with at least one said turbocharger;
    a pressure ratio across a corresponding said multi-stage compressor; and
    a controller coupled with each said sensor and each said variable nozzle, said controller independently controlling operation of each said variable nozzle dependent upon at least one said output signal, said controller controlling operation of each said variable nozzle dependent upon fluctuations of said pressure ratio over time.

11. An internal combustion engine comprising:
    at least one exhaust manifold;
    a plurality of turbochargers, each said turbocharger including:
    a rotatable shaft;
    a turbine having a turbine wheel carried by said shaft, an inlet fluidly coupled with a corresponding said exhaust manifold, and a variable nozzle at said inlet; and
    a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, a radially extending second outlet associated with said second compressor wheel, and an interstage duct fluidly interconnecting in series said first outlet associated with said first compressor wheel with said second inlet associated with said second compressor wheel,
    at least one sensor, each said sensor configured to sense an operating parameter associated with said internal combustion engine and provide an output signal, said at least one sensor including a plurality of speed sensors, each said speed sensor configured to sense a rotational speed of a corresponding said shaft; and
    a controller coupled with each said sensor and each said variable nozzle, said controller independently controlling operation of each said variable nozzle dependent upon at least one said output signal, said controller controlling operation of each said variable nozzle such that each said shaft has a rotational speed which is substantially equal.

12. The internal combustion engine of claim 11, said controller independently controlling operation of each said variable nozzle dependent upon a plurality of said output signals.

13. The internal combustion engine of claim 11, each said sensor configured to sense a corresponding one of:
    a rotational speed of a corresponding said shaft;
    a pressure associated with at least one said turbocharger; and
    a pressure ratio across a corresponding said multi-stage compressor.

14. The internal combustion engine of claim 13, including at least one intake manifold, said pressure corresponding to at least one of:
    said first outlet;
    said second outlet;
    said exhaust manifold; and
    said intake manifold.

15. The internal combustion engine of claim 11, including a memory device for storing data relating to an operating map of each said multi-stage compressor.

16. The internal combustion engine of claim 15, wherein said memory device includes at least one look-up table.

17. The internal combustion engine of claim 16, wherein said memory device includes a plurality of look-up tables, each said look-up table associated with at least one multi-stage compressor.

18. The internal combustion engine of claim 16, wherein each said look-up table includes data corresponding to a surge line of at least one said multi-stage compressor.

19. The internal combustion engine of claim 15, wherein said controller includes said memory device.

20. An internal combustion engine, comprising:
    at least one exhaust manifold;
    a plurality of turbochargers, each said turbocharger including:

a rotatable shaft;

a turbine having a turbine wheel carried by said shaft, an inlet fluidly coupled with a corresponding said exhaust manifold, and a variable nozzle at said inlet; and a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, a radially extending second outlet associated with said second compressor wheel, and an interstage duct fluidly interconnecting in series said first outlet associated with said first compressor wheel with said second inlet associated with said second compressor wheel;

at least one sensor, each said sensor configured to sense an operating parameter associated with said internal combustion engine and provide an output signal, each said sensor configured to sense a corresponding one of a rotational speed of a corresponding said shaft;

a pressure associated with at least one said turbocharger;

a pressure ratio across a corresponding said multi-stage compressor; and a controller coupled with each said sensor and each said variable nozzle, said controller independently controlling operation of each said variable nozzle dependent upon at least one said output signal, said controller controlling operation of each said variable nozzle dependent upon fluctuations of said pressure ratio over time.

21. A method of operating a turbocharger system in an internal combustion engine, comprising the steps of:

providing a plurality of turbochargers, each said turbocharger including:

a rotatable shaft;

a turbine having a turbine wheel carried by said shaft, an inlet and a variable nozzle at said inlet; and a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, a radially extending second outlet associated with said second compressor wheel, and an interstage duct fluidly interconnecting in series said first outlet associated with said first compressor wheel with said second inlet associated with said second compressor wheel;

sensing at least one operating parameter associated with said turbocharger system using a sensor; and independently controlling operation of each said variable nozzle using a controller, dependent upon said sensed operating parameter, said independently controlling step being carried out such that each said shaft has a rotational speed which is substantially equal.

22. The method of claim 21, wherein said sensing step includes sensing at least one of:

a rotational speed of a corresponding said shaft;

a pressure within a corresponding said multi-stage compressor; and a pressure ratio across a corresponding said multi-stage compressor.

23. The method of claim 22, wherein said pressure is at one of said first outlet and said second outlet.

24. A method of operating a turbocharger system in an internal combustion engine, comprising the steps of:

providing a plurality of turbochargers, each said turbocharger including:

a rotatable shaft, a turbine having a turbine wheel carried by said shaft, an inlet and a variable nozzle at said inlet; and a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, a radially extending second outlet associated with said second compressor wheel, and an interstage duct fluidly interconnecting in series said first outlet associated with said first compressor wheel with said second inlet associated with said second compressor wheel;

sensing at least one operating, parameter associated with said turbocharger system using a sensor, said sensing step includes sensing at least one of:

a rotational speed of a corresponding said shaft;

a pressure within a corresponding said multi-stage compressor, said pressure is at one of said first outlet and said second outlet;

a pressure ratio across a corresponding said multi-stage compressor; and independently controlling operation of each said variable nozzle using a controller, dependent upon said sensed operating parameter, said independently controlling step including controlling operation of each said variable nozzle dependent upon fluctuations of said pressure ratio over time.

* * * * *

UNITED STATES PATENT AND TRADEMARK OFFICE
CERTIFICATE OF CORRECTION

PATENT NO.    : 6,357,234 B1  
DATED         : March 19, 2002  
INVENTOR(S)   : John R. Gladden It is certified that error appears in the above-identified patent and that said Letters Patent is hereby corrected as shown below:

Column 4,
Line 40, after the word "shaft", remove the comma and replace with a semicolon.
Line 51, remove the word "interstate" and replace with -- interstage --.

Column 7,
Line 21, add a colon after the word "of".

Column 8,
Line 36, remove the comma after the word "operating".

Signed and Sealed this

Seventeenth Day of September, 2002

Attest:

JAMES E. ROGAN
*Attesting Officer*        *Director of the United States Patent and Trademark Office*